(12) United States Patent
Schein et al.

(10) Patent No.: US 10,807,595 B2
(45) Date of Patent: Oct. 20, 2020

(54) U-TURN ASSISTANCE BASED ON DIFFICULTY IN MANEUVERING

(71) Applicant: Ford Global Technologies, LLC, Dearborn, MI (US)

(72) Inventors: Victoria Leigh Schein, Dearborn, MI (US); Jonathan Thomas Mullen, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 16/069,939

(22) PCT Filed: Jan. 14, 2016

(86) PCT No.: PCT/US2016/013454
§ 371 (c)(1),
(2) Date: Jul. 13, 2018

(87) PCT Pub. No.: WO2017/123232
PCT Pub. Date: Jul. 20, 2017

(65) Prior Publication Data
US 2019/0009778 A1 Jan. 10, 2019

(51) Int. Cl.
*B60W 30/09* (2012.01)
*B60W 30/095* (2012.01)
(Continued)

(52) U.S. Cl.
CPC ........ *B60W 30/0956* (2013.01); *B60W 10/20* (2013.01); *B60W 30/095* (2013.01); *B60W 30/0953* (2013.01); *B60W 40/04* (2013.01); *B60W 40/06* (2013.01); *G01C 21/3407* (2013.01); *G05D 1/0223* (2013.01); *G05D 1/0289* (2013.01); *G06F 16/29* (2019.01); *G08G 1/09626* (2013.01); *G08G 1/096725* (2013.01); *G08G 1/096741* (2013.01); *G08G 1/096775* (2013.01); *G08G 1/166* (2013.01);
(Continued)

(58) Field of Classification Search
CPC ......... B60W 30/0956; B60W 30/0953; B60W 40/04; B60W 40/06; B60W 2540/00; B60W 2550/00; B60W 2710/207; B60W 2750/00; B60K 31/008; G01S 13/93; G08G 1/166
USPC .......................................................... 701/25
See application file for complete search history.

(56) References Cited

U.S. PATENT DOCUMENTS

2009/0157294 A1* 6/2009 Geelen ............... G01C 21/3655
701/532
2009/0243889 A1* 10/2009 Suhr .................. G06K 9/00812
340/932.2
(Continued)

*Primary Examiner* — James M McPherson
*Assistant Examiner* — Tiffany P Ohman
(74) *Attorney, Agent, or Firm* — Brandon Hicks; Eversheds Sutherland (US) LLP

(57) ABSTRACT

Methods, devices and apparatuses pertaining to U-turn assistance. The method may include obtaining, by a computing device, geographic obtaining of a location designated for an operation of a U-turn. The computing device may further obtain vehicle information of a vehicle performing the U-turn, and collect user information of an operator of the vehicle. Based on the geographic information, the vehicle information and the user information, the computing device may determine a level of difficulty of the U-turn and assist the operator with the operation of the U-turn based on the level of difficulty.

20 Claims, 5 Drawing Sheets

(51) Int. Cl.
- *B60W 40/04* (2006.01)
- *B60W 40/06* (2012.01)
- *G01C 21/34* (2006.01)
- *G08G 1/16* (2006.01)
- *G08G 1/0967* (2006.01)
- *G08G 1/0962* (2006.01)
- *G06F 16/29* (2019.01)
- *B60W 10/20* (2006.01)
- *G05D 1/02* (2020.01)

(52) U.S. Cl.
CPC ......... *G08G 1/167* (2013.01); *B60W 2520/10* (2013.01); *B60W 2540/20* (2013.01); *B60W 2540/22* (2013.01); *B60W 2554/00* (2020.02); *B60W 2710/207* (2013.01); *B60W 2720/10* (2013.01)

(56) References Cited

U.S. PATENT DOCUMENTS

| | | | | |
|---|---|---|---|---|
| 2012/0173080 A1* | 7/2012 | Cluff | .................... | B62D 15/028 701/42 |
| 2012/0191343 A1* | 7/2012 | Haleem | .............. | G01C 21/3697 701/431 |
| 2013/0311081 A1* | 11/2013 | Yamakawa | ............ | G01C 21/00 701/428 |
| 2015/0019063 A1* | 1/2015 | Lu | ........................ | G05D 1/0214 701/25 |
| 2015/0057931 A1* | 2/2015 | Pivonka | ............. | G01C 21/3484 701/533 |

\* cited by examiner

U-TURN ASSISTANCE BASED ON DIFFICULTY IN MANEUVERING

TECHNICAL FIELD

The present disclosure generally relates to traffic safety and, more particularly, to methods and systems for U-turn assistance based on difficulty in maneuvering.

BACKGROUND

A vehicle may need to be maneuvered differently when a driver of the vehicle makes certain maneuvers such as a circular turning and stopping. Particularly, the vehicle may not be able to turn completely around in a given area when an object, such as a boat, another vehicle, a trailer or a towable object, is attached to or otherwise towed by the vehicle. Also, for a first time user of a particular vehicle, it may take time for the user to become familiar with the size and safe maneuvering of the vehicle. Therefore, a driver might not be aware of how difficult it is when operating the vehicle to perform such maneuvers.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Implementations herein relate to U-turn assistance based on difficulty in maneuvering. A driving assistance system may provide various levels of assistance to an operator of a vehicle in rendering a U-turn based on a level of difficulty in maneuvering the vehicle to perform the U-turn. The driving assistance system may determine an available space to make the U-turn and plan a movement of the vehicle to successfully complete the U-turn. Based on the level of difficulty of the U-turn, the driving assistance system may notify the operator about a level of automatic control applied to the vehicle during the U-turn in addition to applying the automatic control to the vehicle. An amount of automatic control provided may be proportional to the determined level of difficulty of the U-turn.

Figure 1:
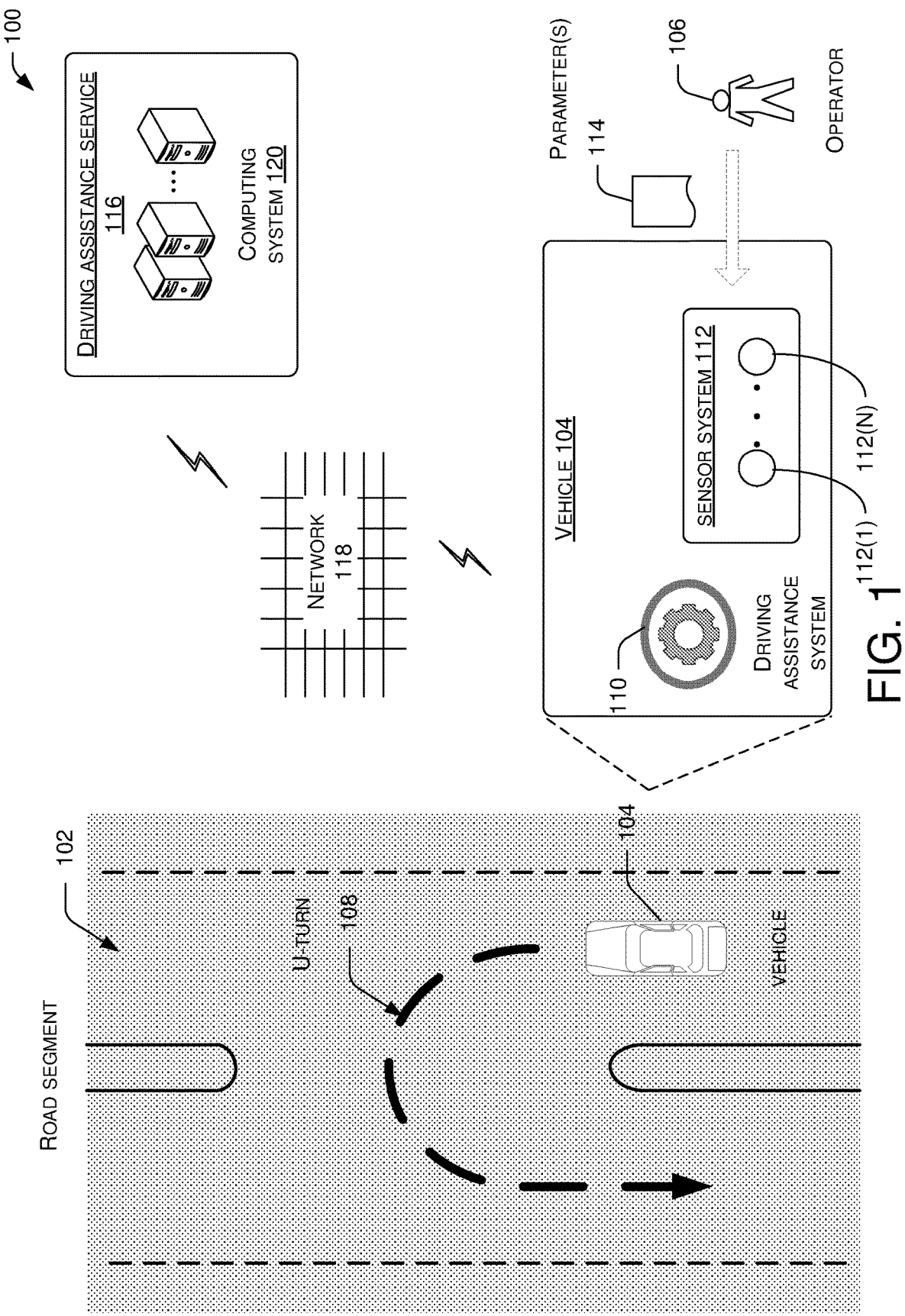
FIG. 1 is a diagram depicting an example environment in which example embodiments of the present disclosure may be implemented.

FIG. 1 illustrates an example environment 100 in which example embodiments of the present disclosure may be implemented. Environment 100 includes a road segment 102 and a vehicle 104 that is operated by an operator 106 to perform a U-turn 108. Vehicle 104 may be equipped with a driving assistance system 110 that facilities driving assistance. In some implementations, driving assistance system 110 may enable communications between the operator 106 and other systems associated with vehicle 104 without interrupting the operation of vehicle 104 by operator 106. For example, driving assistance system 110 may include a vehicle accessory including a human interface device (e.g., a dashboard-mounted touch screen and/or one or more mechanical buttons) that is user-friendly and accessible to operator 106.

In some implementations, driving assistance system 110 may be incorporated into at least one of the following associated with vehicle 104: a vehicle navigation system, a vehicle infotainment system, or a GPS system. In these instances, certain functions of the driving assistance system 110 may be implemented by one or more of the vehicle navigation system, the vehicle infotainment system, and the GPS system associated with vehicle 104.

In some implementations, driving assistance system 110 may include an interface placed within reach of operator 106 such that operator 106 may easily access the interface to launch, trigger or otherwise initiate driving assistance (e.g., U-turn assistance) when operator 106 is operating vehicle 104. For example, one push of a button or touch on the interface may indicate an attempt to make U-turn 108 at a specific location and, in some implementations, this may trigger or otherwise launch a driving assistance application associated with driving assistance system 110.

Vehicle 104 may further include a sensor system 112. Sensor system 112 may include multiple sensors 112(1)-112(N), where N is a positive integer greater than 1, which may be placed on multiple locations of vehicle 104. Sensor system 112 may include various types of sensors such as a laser radar, a vehicle speed sensor, a front-facing camera, a side-facing camera, a side-facing radar, and/or a blinker detector. These sensors detect environmental parameters and vehicle parameters, and provide geographic information and vehicle information at a current location to driving assistance system 110 of vehicle 104.

A laser radar of sensor system 112 may be mounted on the front of vehicle 104 and used for obstacle detection to assist vehicle safely through environments. For example, the laser radar may determine where potential obstacle(s) exist(s) in the environment and where vehicle 104 is in relation to potential obstacle(s). The laser radar may be configured for free space sensing and/or motion planning to detect objects and determine feasible paths for U-turn 108 at road segment location. In some implementations, other sensors, such as an ultrasonic three-dimensional (3D) imaging system, may also be configured for free space sensing and/or motion planning.

A vehicle speed sensor of sensor system 112 may detect a traveling speed of vehicle 104 based on, for example, a rotational speed of a wheel of vehicle 104. A front facing camera of sensor system 112 may be mounted on the front of vehicle 104 to detect a road environment ahead of vehicle 104. The front facing camera may generate images of a road ahead of vehicle 104 and transmit the images to driving assistance system 110. A blinker detector of sensor system 112 may detect an actuation state of blinkers or direction indicators by operator 106 with respect to vehicle 104.

In some implementations, sensor system 112 may include detachable sensors, which may be temporarily attached to vehicle 104. For example, the attachable sensors may be placed on a plurality of locations of vehicle 104 (e.g., multiple corners of vehicle 104). The attachable sensors may include ultrasonic or capacitive sensors with a certain attaching mechanism (e.g., magnets, stick on, and mounted). Once the sensors are positioned, a reader in vehicle 104 (e.g., driving assistance system 110) may receive signals from the sensors via, for example, Bluetooth, Near Field Communication (NFC), infrared and/or Wi-Fi and then provide information indicative of sensed parameters to driving assistance system 110.

In some implementations, sensor system 112 may include various sensors, such as biosensors, configured to collect one or more predetermined psychological parameters related to a level of relaxation, a level of muscle tension, a level of concentration, and/or a level of nervousness. For example, a touch sensor may be incorporated into a steering wheel of vehicle 104 such that one or more parameters 114 indicating a level of nervousness of operator 106 may be collected and transmitted to driving assistance system 110. In some implementations, a wearable device (e.g., a smart watch) may be used to collect parameter(s) 114 indicating the level of nervousness of operator 106 and transmit information indicative of the collected parameter(s) 114 to driving assistance system 110.

In some implementations, driving assistance system 110 may communicate with a remote driving assistance service 116 via a network 118. Network 118 may include wired and/or wireless networks that enable communications between the various computing devices described in environment 100. In some embodiments, network 118 may include local area networks (LANs), wide area networks (WAN), mobile telephone networks (MTNs), and other types of networks, possibly used in conjunction with one another, to facilitate communication between the various computing devices.

Driving assistance service 116 may include a set of related software and/or hardware components that may be reused for different purposes, and may function together with user-defined policies to provide driving assistance to operator 106. In some implementations, driving assistance service 116 may include a computing system 120 (e.g., one or more servers) which may be configured to facilitate the driving assistance associated with driving assistance system 110. For example, computing system 120 may provide geographic information associated with road segment 102 and vehicle information of vehicle 104 to driving assistance system 110 in response to a request from driving assistance system 110 via network 118.

In some implementations, driving assistance system 110 may obtain geographic information of road segment 102, vehicle information of vehicle 104, and user information of operator 106. Further, driving assistance system 110 may determine a level of difficulty of U-turn 108 based on the geographic information, vehicle information and the user information, and then assist operator 106 with operation of vehicle 104 to render U-turn 108 based on the level of difficulty of U-turn 108.

In some implementations, driver assistance system 110 may record in a buffer reading from sensor system 112 on approach to a potential U-turn location or while going by a potential U-turn location. The recorded readings may be used later to evaluate whether a potential planned is collision-free. The recorded readings may be transferred through network 118, processed by driver assistance service 116 then stored on computing system 120.

Figure 2:
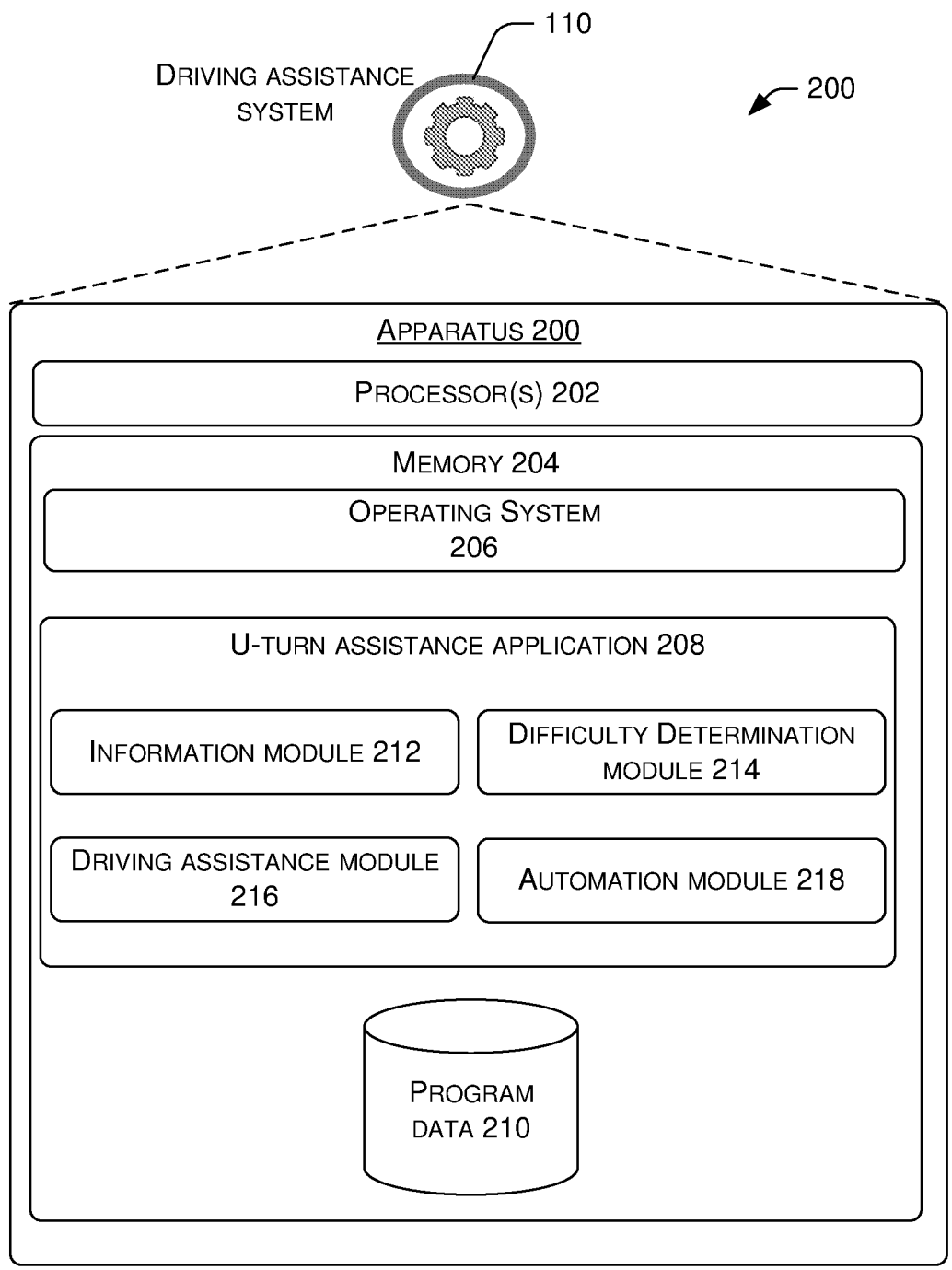
FIG. 2 is a block diagram depicting an example apparatus in accordance with an embodiment of the present disclosure.

FIG. 2 illustrates an example apparatus 200 in accordance with an embodiment of the present disclosure. Apparatus 200 may be an example implementation of driving assistance system 110 and, as depicted in FIG. 2, shows additional details of driving assistance system 110. Apparatus 200 may include at least those components shown in FIG. 2 as well as other components not shown, which may include additional modules, kernels, data, and/or hardware.

Apparatus 200 may include one or more processors 202 and memory 204. Memory 204 may store various modules, applications, programs, or other data, including one or more sets of instructions that, when executed by processor(s) 202, cause processor(s) 202 to perform the operations described herein pertaining to U-turn assistance. Processor(s) 202 may include one or more central processing units (CPU), one or more graphics processing units (GPU) and one or more application-specific integrated circuits (ASIC).

Apparatus 200 may include additional data storage devices (removable and/or non-removable) including one or more computer-readable media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. A system memory, a removable storage and a non-removable storage may be examples of computer storage media. Computer storage media may include, but is not limited to, random-access memory (RAM), read-only memory (ROM), electrically erasable programmable read-only memory (EEPROM), flash memory or other memory technology, compact disc (CD)-ROM, digital versatile disks (DVD), or other optical storage, magnetic cassettes, magnetic tape, magnetic disk storage or other magnetic storage devices, or any other medium that can be used to store the desired information and which can be accessed by apparatus 200. Any such computer storage media may be part of apparatus 200. Moreover, the computer-readable media may include computer-executable instructions that, when executed by processor(s) 202, perform various functions and/or operations described herein.

In some implementations as shown in FIG. 2, memory 204 may store one or more sets of instructions associated with an operating system 206, a U-turn assistance application 208 and program data 210. The U-turn assistance application 208 may include various modules such as an information module 212, a difficulty determination module 214, a driving assistance module 216, and an automation module 218.

Information module 212 may be configured to obtain geographic information of road segment 102 for an operation of U-turn 108. In some implementations, information module 212 may obtain geographic information to detect objects and determine one or more feasible paths to render U-turn 108. For example, a laser radar may be used to implement free space sensing and motion planning by determining where potential obstacle(s) exist(s) in the environment of road segment 102 and where vehicle 104 is in relation to the potential obstacle(s).

Geographic information refers to vehicle information and behavior that are relate to a geographic location of vehicle 104. Geographic location refers to a relative location (e.g., San Francisco, 500 Sea World Drive, San Diego, Calif. 92109, etc.) as a displacement for another site or an absolute location using a coordinate system (e.g., a spherical coordinate system or a world geodetic system). In some implementations, the geographic information may include images of a road segment ahead of vehicle 104 that are collected by sensor system 112. These images may be used to generate an assistance instruction provided to operator 106 to assist operator 106 to operate vehicle 104 in rendering U-turn 108.

In some implementations, information module 212 may obtain vehicle information of vehicle 104. The obtained vehicle information may include various static parameters (e.g., a length of vehicle 104, a width of vehicle 104, a turning radius, and vehicle tow ratings), control parameters (e.g., steering parameters, braking parameters, and throttle parameters), and/or performance parameters (e.g., a speed, a heading, and a location) associated with vehicle 104. A turning radius of vehicle 104 is the radius of a circular turn that vehicle 104 is capable of making. For example, the turning radius of U-turn 108 may refer to the smallest circular turn that vehicle 104 may make without hitting a street curb with a wheel or without scraping a wall around the street by vehicle 104. The turning radius of the vehicle may be calculated using a turning radius algorithm based on parameters of vehicle 104. In some implementations, the parameters of vehicle 104 may include a maximum steer angle of the front wheels of vehicle 104 and the wheelbase of vehicle 104. The wheelbase of vehicle 104 is a distance between the front wheels of vehicle 104 and the rear wheels of vehicle 104.

In some implementations, information module 212 may generate a feasible path of U-turn 108 at road segment 102 based on the vehicle information of the vehicle 104 and the geographic information associated with road segment 102. A feasible path refers to a driving path or map in which vehicle 104 may avoid obstructions and stay within lane boundaries from a starting point to an endpoint of U-turn 108. In some implementations, there may be more than one feasible paths that are generated based on the geographic information and/or vehicle information. In these instances, a feasible path may be selected and may be constantly modified for U-turn feasibility assessment.

In some implementations, information module 212 may identify obstructions in the feasible path, and identify obstructions in the feasible path using sensors system 112 or pre-stored geographic information associated with road segment. An obstruction refers to an object that impedes or prevents moving of vehicle 104. For example, the obstruction may include a stationary object and a moving object. A stationary object may include a bump, a wall, a curb, a traffic sign, and any obstacle or blockage on a driving path of vehicle 104. A moving object may include an oncoming vehicle and a human or cyclist moving toward vehicle 104 on the driving path of vehicle 104. For example, information module 212 may collect information of oncoming traffic at road segment 102 to identify one or more potential collisions associated with the feasible path.

In some implementations, information module 212 may collect user information of operator 106. User information includes a collection of records of user information (e.g., user preference data) and behavior (e.g., user behavior data) that is, for example, associated with driving of vehicle 104.

User preference data may include choices that the user has made with respect to U-turns (e.g., highly comfortable, partially comfortable, not comfortable, etc.). For example, the user preference data may include implicit and/or explicit information about operator 106, the extent to which operator 106 likes or dislikes U-turn operation. The implicit and/or explicit information may be extracted from previous user interactions with driving assistance system 110. For example, explicit information may be in the form of ratings associated with the U-turn operation, and implicit information may be generated by interpreting the user interactions.

Further, information module 212 may monitor user behavior of the operator 106 during the operation of vehicle 104 for each U-turn. User behavior data may include user interaction with driving assistance system 110 during U-turn 108. For example, the user behavior may include at least one of the following: a steering wheel pressure, a heart rate, or a level of sweat of operator 106. Based on the user behavior of operator 106, information module 212 may determine a level of nervousness of operator 106.

Difficulty determination module 214 may be configured to determine a level of difficulty of a given U-turn based on the geographic information, the vehicle information and the user information that are collected by information module 212. For example, difficulty determination module 214 may determine a first level of difficulty of U-turn 108 based on the obstructions in the feasible path and information of oncoming traffic that is collected by sensor system 112. Further, difficulty determination module 214 may determine a second level of difficulty of U-turn 108 based on the user information of operator 106 (e.g., the level of nervousness of operator 106). In these instances, difficulty determination module 214 may aggregate the first level of difficulty and the second level of difficulty to generate a resultant level of difficulty using a predetermined weighting algorithm.

Driving assistance module 216 may be configured to assist operator 106 with the operation of U-turn 108 based on the level of difficulty. For example, driving assistance module 216 may monitor the operation of U-turn 108 by operator 106, and modify the level of difficulty based on the monitored operation and the information of oncoming traffic associated with road segment 102. In these instances, driving assistance module 216 may assist operator 106 with the operation of vehicle 104 in rendering U-turn 108 based on the modified level of difficulty.

Driving assistance module 216 may further determine whether the level of difficulty is greater than a predetermined value. In response to a determination that the level of difficulty is greater than the predetermined value, automation module 218 may be configured to implement automatic lateral and longitudinal control to effect one or more operations of vehicle 104 in rendering U-turn 108. For example, automation module 218 may perform at least partial automatic control on the speed and angle of turn of vehicle 104 such that U-turn 108 is consistent with the feasible path at a feasible speed.

Automatic control refers to controlling of processes of operation of vehicle 104 with little or no human intervention. The automatic control may be implemented by lateral and longitudinal controlling system of vehicle 104 combined with driving assistance system 110. In some implementations, the automatic control may include automatic steering control and automatic speed control of vehicle 104. For example, driving assistance system 110 may enable longitudinal control and lateral control of vehicle 104 by coordinating a steering system of vehicle 104 and a speed controlling system of vehicle 104 such that vehicle 104 follows a feasible path of U-turn 108 at a feasible speed.

Information module 212 may monitor the rendering of U-turn 108 by operator 106, and driving assistance module 216 may modify the level of difficulty based on the monitored operation in response to a determination that the level of difficulty is not greater than the predetermined value.

In some implementations, a route planning algorithm (e.g., A-Star graph routing algorithm) may be implemented to determine more than one sequence of links (e.g., possible paths), including U-turns and non-U-turns, connecting a source node (e.g., current location) and a destination node (e.g., destination). In these instances, the sequence or path among multiple sequences/paths with the lower/lowest cost may be selected.

Figure 3:
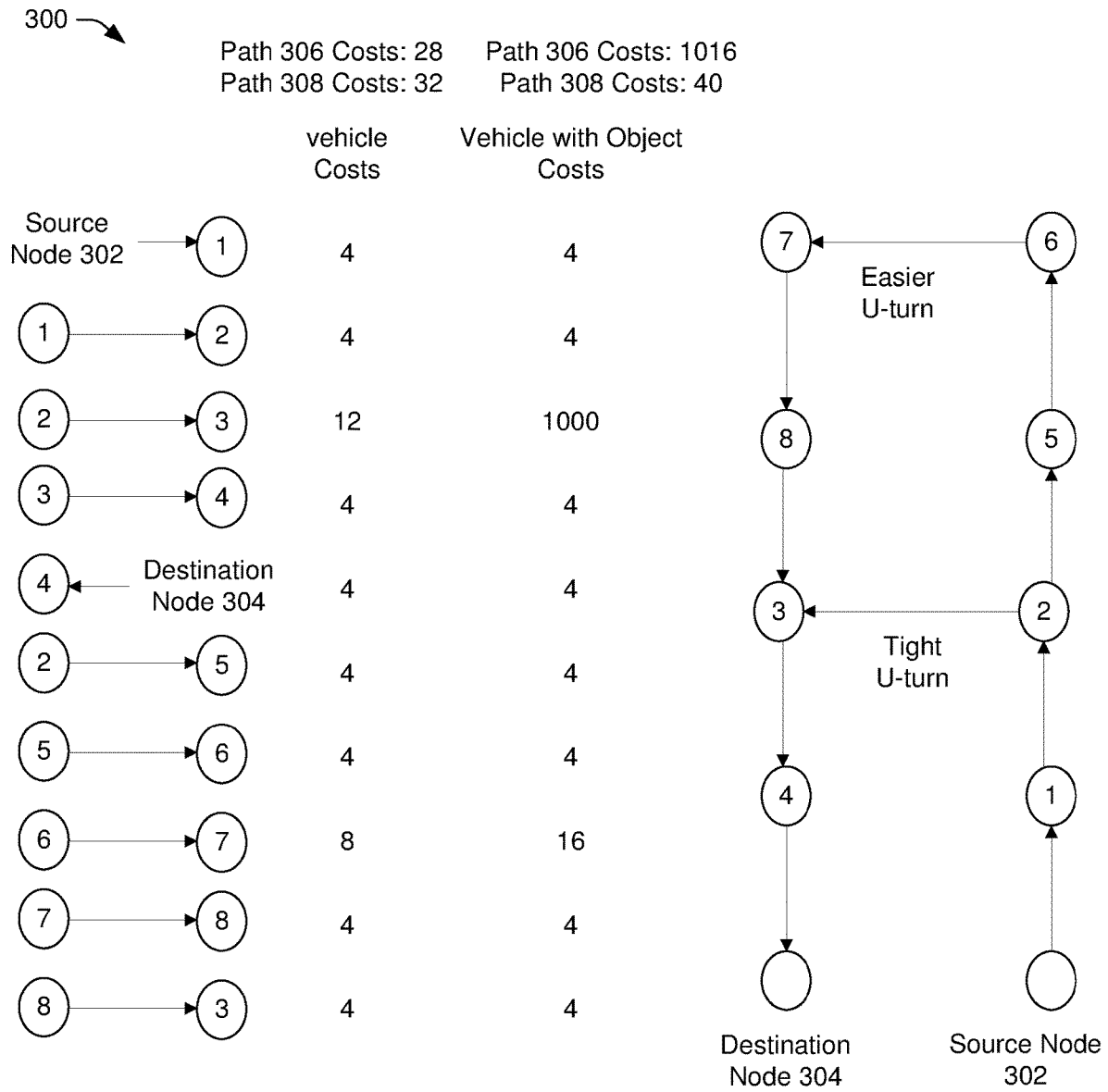
FIG. 3 is a diagram depicting implementation of an example route planning algorithm in accordance with an embodiment of the present disclosure.

For example, as illustrated in FIG. 3, two sequences of links connecting a source node 302 and a destination node 306 may correspond to a path 306 and a path 308, respectively. Using the route planning algorithm, driving assistance module 216 may calculate the total costs of link costs of each potential path, namely path 306 and path 308. For example, the total costs associated with path 306 for a passenger vehicle may be 28 and the total costs associated with path 308 for the passenger vehicle may be 32. Accordingly, driving assistance module 216 may select path 306 instead of path 308 as the feasible route for the passenger vehicle. As another example, the total costs associated with path 306 for a vehicle towing an object may be 1016 and the total costs associated with path 308 for the vehicle may be 40. Accordingly, driving assistance module 216 may select path 308 instead of path 306 as the feasible route for the vehicle towing an object.

In some implementations, certain information associated with vehicle 104 and a plurality of paths may be further utilized to determine a feasible route using, for example, a rapidly exploring random tree (RRT) path-planning algorithm. In these instances, the certain information may include allowable configurations of one or more paths associated with the feasible route, and constraints (e.g., the max steering angle) associated with the one or more paths and vehicle 104. Further, driving assistance module 216 may obtain information to evaluate whether a candidate path from one configuration to another is collision-free. For example, the configuration associated with a vehicle may include a geographic coordinate of a location of the vehicle and a direction that the vehicle is facing. For a truck with a trailer, the configuration may include a geographic coordinate of a location of the vehicle, a direction the truck is facing, and an angle of the trailer relative to the truck.

Figure 4:
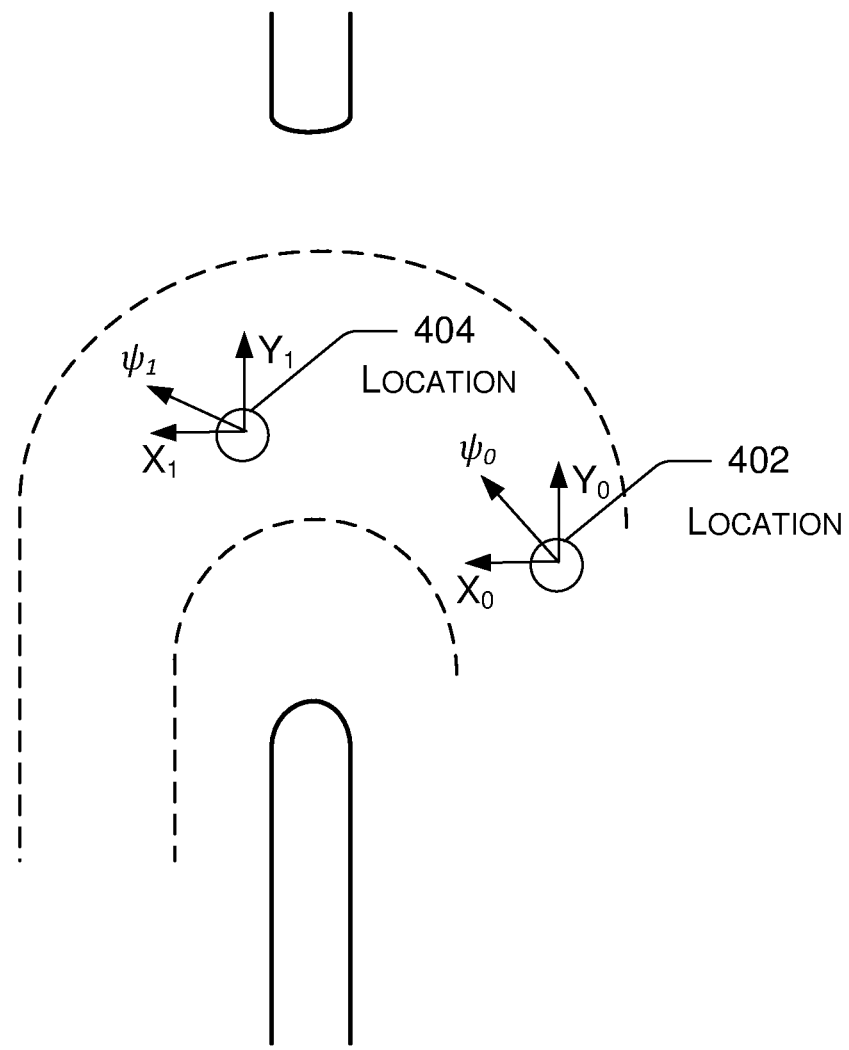
FIG. 4 is another diagram depicting implementation of an example path planning algorithm in accordance with an embodiment of the present disclosure.

For example, as illustrated in FIG. 4, vehicle 104 may make a U-turn from a location 402 to a location 404. A path planning algorithm may be implemented to compute collision-free path while ignoring constraints, and then transform the path to one that obeys constraints. Assume a collision computation function C exits as follows: C: (X, y)×(X, y)→{0,1}, routing module 218 may determine that the path between location 402 to location 404 is collision-free for certain vehicle parameters (e.g., length, width, trailer parameters, etc.) of vehicle 104. In these instances, driving assistance module 216 may determine certain dynamics using the following formulas, wherein x represents an easting coordinate, y represents a northing coordinate, θ represents a vehicle heading, φ represents a steering angle, x' represents a derivative in the easting coordinate with respect to time, y' represents a derivative in the northing direction with respect to time, θ' represents a derivative in the steering angle with respect to time, u represents velocity of a vehicle, and L represents wheelbase of the vehicle, assuming u=u$_0$ and constrain steering angle |φ|<Φ.

$$x' = u\cos\theta$$
$$y' = u\sin\theta$$
$$\theta' = \frac{u}{L}\tan\phi$$

Figure 5:
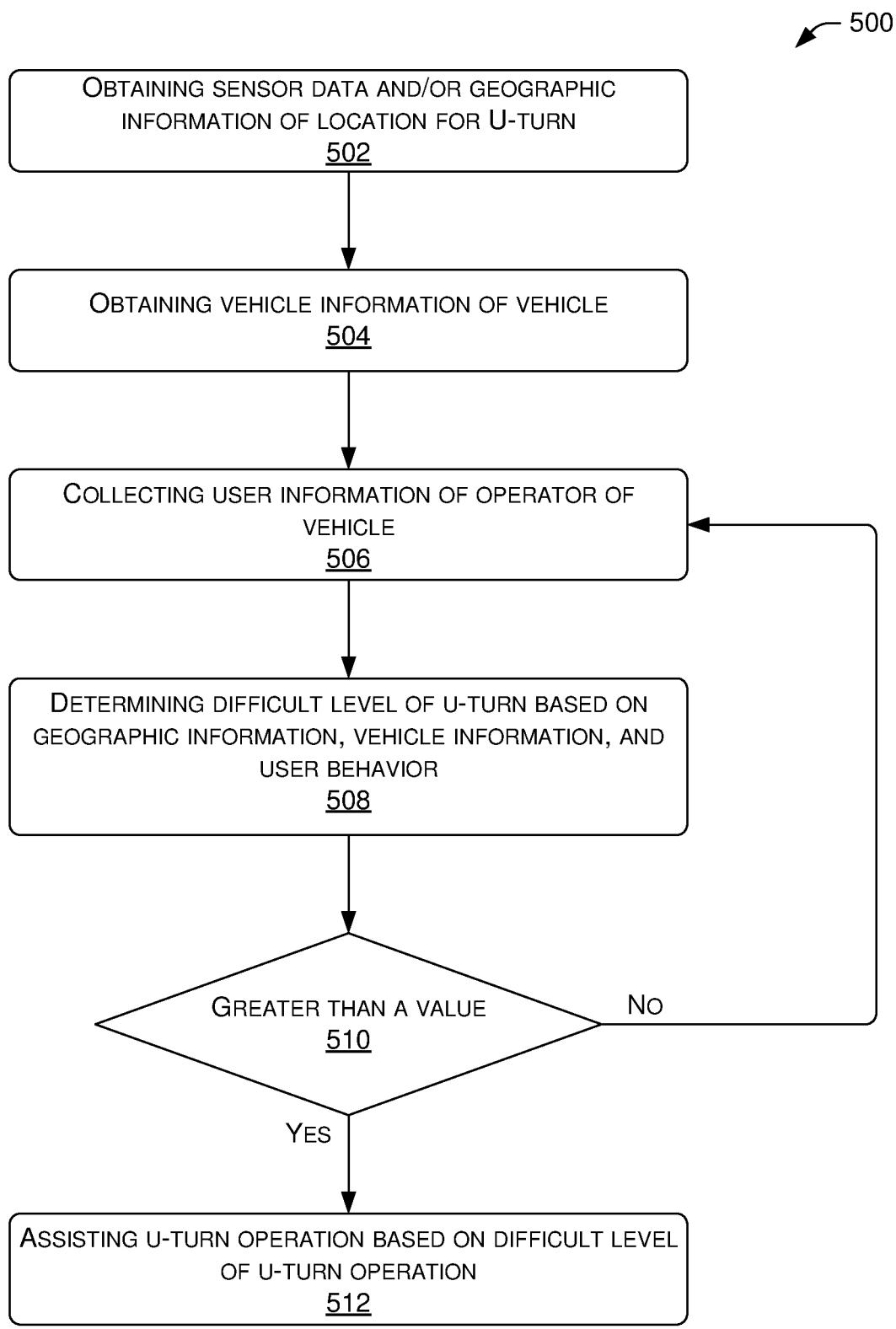
FIG. 5 is a flowchart of an example process in accordance with an embodiment of the present disclosure.

FIG. 5 illustrates an example process 500 in accordance with an embodiment of the present disclosure. Process 500 may include one or more operations, actions, or functions shown as blocks such as 502, 504, 506, 508, 510 and 512. Although illustrated as discrete blocks, various blocks of process 500 may be divided into additional blocks, combined into fewer blocks, or eliminated, depending on the desired implementation. Process 500 may be implemented by driving assistance system 110 and apparatus 200. For simplicity of description and not limiting the scope of the present disclosure, process 300 is described below in the context of apparatus 200 as an example implementation of driving assistance system 110. Process 500 may begin with block 302.

At 502, processor(s) 202 may obtain sensor data and/or geographic information of a location designated for an operation of U-turn 108. For example, processor(s) 202 may obtain geographic information at road segment 102 using a free space sensing technique and a motion planning technique. Alternatively or additionally, processor(s) 202 may receive sensor data (e.g., from sensor system 112). In some implementations, processor(s) 202 may generate a feasible path of U-turn 108 at road segment 102 based on vehicle information of vehicle 104 and the geographic information of road segment 102. Processor(s) 202 may further identify obstructions in the feasible path, and identify the obstructions in the feasible path using sensor system 112 of vehicle 104 and/or pre-stored geographic information associated with road segment 102.

In some implementations, processor(s) 202 may collect information of oncoming traffic at road segment 102 to identify one or more potential collisions associated with the feasible path. Further, processor(s) may monitor user behavior of operator 106 during the operation of U-turn 108. In these instances, the user behavior may include at least one of a steering wheel pressure, a heart rate, or a level of sweat of operator 106 such that processor(s) 202 may determine a level of nervousness of operator 106.

At 504, processor(s) 202 may obtain vehicle information of vehicle 104 performing U-turn 108. For example, vehicle information of vehicle 104 may include a length and a width of vehicle 104 and a turning radius of vehicle 104.

At 506, processor(s) 202 may collect user information of an operator of vehicle 104. For example, user information includes a collection of records of user information (e.g., user preference data) and behavior (e.g., User behavior data) that is, for example, associated with driving of vehicle 104. In some implementations, processor(s) may detect a predetermined event indicating a U-turn intention. For example, the predetermined event may be associated with a state of blinkers of vehicle 104 and a speed of vehicle 104.

At 508, processor(s) 202 may determine a level of difficulty of U-turn 108 based on the geographic information, vehicle information and the user information. For example, processor(s) 202 may determine a first level of difficulty of U-turn 108 based on the obstructions in the feasible path and information of oncoming traffic, and determine a second level of difficulty of U-turn 108 based on the user information of operator 106. In these instances, the user information of operator 106 may include the level of nervousness of operator 106. Further, processor(s) 202 may aggregate the first level of difficulty and the second level of difficulty to generate the level of difficulty using a predetermined weighting algorithm.

At 510, processor(s) 202 may determine whether the level of difficulty is greater than a predetermined value. For example, the predetermined value may be generated based on statistic data related to one or more operators performing U-turns at a location (e.g., road segment 102).

At 512, processor(s) 202 may assist operator 106 of U-turn if the level of difficulty is greater than the predetermined value ("Yes" branch of operation 510). In some implementations, processor(s) 202 may implement automatic lateral and longitudinal control to automate one or more operations of operator 106 on vehicle 104. For example, processor(s) 202 may perform at least partial automatic control such that U-turn 108 is consistent with the feasible path at a feasible speed.

A loop or iteration of operations including operations 506, 508 and 510 may be performed if the level of difficulty is not greater than the predetermined value (i.e., "No" branch of operation 510). For example, processor(s) 202 may monitor the operation of U-turn 108 by operator 106, and modify the level of difficulty based on the monitored operation.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
obtaining geographic information of a location designated for an operation of a U-turn;
determining that an operator of a vehicle is performing a U-turn operation at the location;
obtaining vehicle information of the vehicle;
collecting user information of the operator of the vehicle;
determining a level of difficulty of the U-turn based on the geographic information, the vehicle information, and the user information;
determining that the level of difficulty is greater than a predetermined value; and
assisting, by the vehicle and based on the determination that the level of difficulty is greater than the predetermined value, the operator with the operation of the U-turn, wherein the assistance includes implementing automatic lateral control and longitudinal control to automate one or more operations of the vehicle.

2. The method of claim 1, wherein the obtaining the geographic information of the location further comprises obtaining the geographic information of the location using a free space sensing technique and a motion planning technique.

3. The method of claim 1, wherein the obtaining of the geographic information of the location further comprises:
generating a feasible path of the U-turn at the location based on the vehicle information and the geographic information;
identifying one or more obstructions in the feasible path; and
collecting information of an oncoming traffic at the location to identify one or more potential collisions associated with the feasible path.

4. The method of claim 3, wherein the identifying of the one or more obstructions in the feasible path further comprises identifying the one or more obstructions in the feasible path using one or more sensors attached to the vehicle, pre-stored geographic information associated with the location, or a combination thereof.

5. The method of claim 3, further comprising:
monitoring user behavior of the operator during the operation of the U-turn, the user behavior comprising a steering wheel pressure, a heart rate, a level of sweat of the operator, or a combination thereof; and
determining a level of nervousness of the operator based on the monitoring.

6. The method of claim 5, wherein the determining of the level of difficulty of the U-turn based on the geographic information, the vehicle information and the user information further comprises:
   determining a first level of difficulty of the U-turn based on the one or more obstructions in the feasible path and the information of the oncoming traffic;
   determining a second level of difficulty of the U-turn based on the user information of the operator, the user information of the operator comprising the level of nervousness of the operator; and
   aggregating the first level of difficulty and the second level of difficulty to generate the level of difficulty using a predetermined weighting algorithm.

7. The method of claim 3, wherein the assisting of the operator with the U-turn based on the level of difficulty further comprises:
   monitoring the operation of the U-turn by the operator during the U-turn;
   modifying the level of difficulty based on the monitored operation and the information of the oncoming traffic; and
   assisting, based on the modified level of difficulty and during the U-turn operation, the operator with the U-turn.

8. The method of claim 3, wherein the assisting of the operator with the U-turn further comprises:
   in response to a determination that the level of difficulty is not greater than the predetermined value, performing operations comprising:
   monitoring the operation of the U-turn by the operator, and
   modifying the level of difficulty based on the monitored operation.

9. The method of claim 8, wherein the implementing of the automatic lateral control and the longitudinal control further comprises:
   performing at least partial automatic control such that the U-turn is consistent with the feasible path at a feasible speed, the at least partial automatic control comprising automatic steering control, automatic speed control, or a combination thereof.

10. The method of claim 1, wherein the vehicle information of the vehicle comprises a length and a width of the vehicle and a turning radius of the vehicle.

11. The method of claim 1, further comprising:
   detecting a predetermined event indicating a U-turn intention, the predetermined event associated with a state of blinkers of the vehicle and a speed of the vehicle.

12. A system comprising:
   a processor; and
   a memory to maintain a plurality of components executable by the one or more processors, the plurality of components comprising:
   an information module configured to:
      obtain geographic information of a location designated for an operation of a U-turn;
      determine that an operator of a vehicle is performing a U-turn operation at the location;
      obtain vehicle information of the vehicle; and
      collect user information of the operator of the vehicle;
   a difficulty determination module configured to:
      determine a level of difficulty of the U-turn based on the geographic information, the vehicle information and the user information; and
      determine that the level of difficulty is greater than a predetermined value; and
   a driving assistance module configured to assist, by the vehicle and based on the determination that the level of difficulty is greater than the predetermined value, the operator with the operation of the U-turn, wherein the assistance includes implementing automatic lateral control and longitudinal control to automate one or more operations of the vehicle.

13. The system of claim 12, wherein the obtaining of the geographic information of the location further comprises:
   generating a feasible path of the U-turn at the location based on the vehicle information and the geographic information;
   identifying one or more obstructions in the feasible path; and
   collecting information of an oncoming traffic at the location to identify one or more potential collisions associated with the feasible path.

14. The system of claim 12, wherein the plurality of components further comprise an automation module configured to implement automatic lateral control and longitudinal control to automate one or more operations of the vehicle if the level of difficulty is greater than a predetermined value.

15. The system of claim 12, wherein the vehicle information of the vehicle comprises a length and a width of the vehicle and a turning radius of the vehicle.

16. One or more computer-readable media storing computer-executable instructions that, when executed on one or more processors, causes the one or more processors to perform acts comprising:
   obtaining geographic information of a location designated for an operation of a U-turn;
   determining that an operator of a vehicle is performing a U-turn operation at the location;
   obtaining vehicle information of the vehicle;
   collecting user information of the operator of the vehicle;
   determining a level of difficulty of the U-turn based on the geographic information, the vehicle information and the user information;
   monitoring the operation of the U-turn by the operator;
   determining a modified level of difficulty based on the monitored operation; and
   determining that the modified level of difficulty is greater than a predetermined value; and
   assisting, by the vehicle and based on the determination that the modified level of difficulty is greater than the predetermined value, the operator with the U-turn, wherein the assistance includes implementing automatic lateral control and longitudinal control to automate one or more operations of the vehicle.

17. The one or more computer-readable media of claim 16, wherein the acts further comprise implementing automatic lateral control and automatic longitudinal control to automate one or more operations of the vehicle if the modified level of difficulty is greater than a predetermined value.

18. The one or more computer-readable media of claim 16, wherein the obtaining of the geographic information of the location further comprises:
   generating a feasible path of the U-turn at the location based on the vehicle information and the geographic information;
   identifying one or more obstructions in the feasible path; and collecting information of an oncoming traffic at the location to identify one or more potential collisions associated with the feasible path.

19. The one or more computer-readable media of claim 18, wherein the identifying of the one or more obstructions in the feasible path further comprises identifying the one or more obstructions in the feasible path using one or more sensors attached to the vehicle, pre-stored geographic information associated with the location, or a combination thereof.

20. The one or more computer-readable media of claim 16, wherein the acts further comprise:
 monitoring user behavior of the operator during the operation of the U-turn, the user behavior comprising a steering wheel pressure, a heart rate, a level of sweat of the operator, or a combination thereof; and
 determining a level of nervousness of the operator based on the monitoring, the user information comprising data associated with the user behavior.

* * * * *